March 31, 1970 W. J. KUHN ETAL 3,503,379
RADIANT HEATING DEVICE

Filed Jan. 12, 1968 3 Sheets-Sheet 1

INVENTORS
WILLIAM J. KUHN
PAUL E. MAURICE
BY
Morgan, Finnegan, Durham & Pine
ATTORNEYS March 31, 1970   W. J. KUHN ET AL   3,503,379
RADIANT HEATING DEVICE Filed Jan. 12, 1968   3 Sheets-Sheet 2

INVENTORS
WILLIAM J. KUHN
PAUL E. MAURICE

BY Morgan, Finnegan, Durham & Pine
ATTORNEYS

March 31, 1970  W. J. KUHN ET AL  3,503,379
RADIANT HEATING DEVICE
Filed Jan. 12, 1968  3 Sheets-Sheet 3

INVENTORS
WILLIAM J. KUHN
PAUL E. MAURICE
BY
Morgan, Finnegan, Durham & Pine
ATTORNEYS

United States Patent Office 3,503,379
Patented Mar. 31, 1970

3,503,379
RADIANT HEATING DEVICE
William J. Kuhn, Springfield, and Paul E. Maurice, Ludlow, Mass., assignors to Heatbath Manufacturing Co., Inc., Indian Orchard, Mass., a corporation of Massachusetts
Filed Jan. 12, 1968, Ser. No. 697,500
Int. Cl. F24c *3/04;* F23d *13/14*
U.S. Cl. 126—85                                 19 Claims

ABSTRACT OF THE DISCLOSURE

A radiant heater having a non-primary aerated burner, one embodiment of which comprises a poultry brooder, includes a base plate having an aperture extending axially therethrough and a plurality of upwardly protruding flanges which locate the various portions of the heating unit. An annular burner having a plurality of ports upwardly inclined from the horizontal surrounds a cylindrical support tube which in turn is assembled over the aperture in the base plate. A reflecting heat shield with a single central hole is mounted to the other end of the tube to provide heat distribution. A pervious radiant member is mounted a predetermined distance from the burner so that the flame emanating from the burner envelopes the radiant when impinged thereon. An outer heat shield is also mounted on the base plate a spaced distance from the pervious radiant.

Background and objects of the invention

The present invention relates generally to radiant heating devices and, more particularly, to a novel and improved radiant heating device having a non-primary aerated blue flame gas burner, also commonly known as a luminous flame burner. The novel heater is characterized by the burner, which comprises a tubular member arranged in a circular form and having a plurality of ports upwardly inclined from the horizontal, and by the burner flame, which impinges on a pervious radiant member to thereby provide the desired radiant heat over a wide range of inputs. Furthermore, due to its low turn down characteristic, the burner acts as its own pilot.

The novel radiant heating device of the present invention represents a marked improvement over conventional Bunsen-type burners having a venturi arrangement, which are subject to stoppage by lint, dust, feathers and other airborne particles. In addition, one application of the present heater is in poultry houses where conditions are quite severe at times and large amounts of heat are required to dry out litter. During warmer weather, however, the burner is required to operate at very low outputs. Bunsen flame burners which are ordinarily used to heat radiants operate over a considerably smaller range and this inhibits their flexibility; moreover, they are subject to blow back and burning in the venturi.

The novel heater device of the present invention is also advantageously dissimilar from presently available commercial heating units, such as the type disclosed in Patent 3,027,888 to H. D. Du Fault and W. J. Kuhn. While the aforementioned patent pertains to a poultry brooder having a non-primary aerated or luminous flame burner, the construction is such that the flame cannot be impinged on any surface to produce a radiant effect. A high input is available with the heater of this invention from a relatively small burner and this input may be varied automatically from a very low flame to the maximum design input. Thus, wider and more even temperature control is possible by means of modulating low cost temperature controls.

The heating device employs a non-primary aerated burner to heat a pervious radiant member, thereby eliminating an air mixer and the need for air adjustments. The unique assembly prevents flash-back and there is no clogging of the air mixer or burner due to lint or dust being inspirated with primary air. A further and primary advantage of the unique arrangement of the burner and pervious radiant means is that the heater may be operated as a combination luminous flame burner and a non-primary aerated blue flame burner. Another feature of the invention is the stack action provided by the heating unit design wherein cool air is drawn into the support tube from the floor level, heated and then expelled from the top of the unit.

It is therefore an object of the present invention to provide a new and improved radiant heating device.

Another object of the present invention is to provide a new and improved radiant heating device which is capable of compact construction and yet able to produce relatively large amounts of radiant heat.

Another object of the present invention is to provide a new and improved radiant heating device having characteristics particularly desirable for use in poultry brooders and which eliminates common disadvantages in present brooder house heaters.

Another object of the present invention is to provide a new and improved radiant heating device which may be operated both as a luminous flame burner and as a non-primary aerated blue flame burner.

Another object of the present invention is to provide a new and improved radiant heating device of the non-primary aerated burner type.

Another object of the present invention is to provide a new and improved radiant heating device of the non-primary aerated burner type wherein the flame from the burner may be impinged upon a radiant surface to thereby produce a radiant heating effect when the burner is operated as a blue flame burner.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Summary of the invention

The present invention pertains to a unique heating device having a novel burner arrangement for heating a pervious radiant member. The heating device, which advantageously may be used as a poultry brooder, comprises a base plate having an aperture extending axially therethrough, an outer flange portion about the periphery of the base plate, an intermediate flange portion and in inner flange portion about the periphery of the aperature. The flange portions aid in positioning the various portions of the heating unit on the base plate The heating unit preferably comprises an elongated support tube mounted over the aperture and a substantially annular burner mounted thereabout. The burner includes a plurality of gas ports upwardly inclined from the horizontal at a predetermined angle to provide a flame which impinges on a pervious radiant member spaced a set distance therefrom. An outer heat shield surrounds the radiant member while a reflecting heat shield is mounted to the top of the support tube.

In operation, gas is supplied to the burner and issues from the burner ports at a velocity controlled by a modulating or snap-action type thermostat to provide the required heat. At very low gas velocities, the gas burns at the ports with a small blue bead but as the velocity increases, the gas burns with a yellow (luminous) flame until the velocity of gas issuing from the ports exceeds the velocity of flame propagation and the visible flame leaves the port. As the gas pressure and, consequently, the gas velocity increases, the flame reaches the screen at a predetermined angle. The velocity of the flaming gases is thereupon slowed and the flame completely envelops the pervious radiant member. The axial tube provides a stack action to facilitate the heating process while the overall design is such that a great amount of radiant heat is produced in a small combustion space and at a minimum cost while maintaining full flame modulation down to very low inputs. In the illustrated embodiment, the distance from the burner to the radiant screen varies with the maximum gas pressure, port size and type of gas.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

Brief description of the drawings of the drawings.

Description of the preferred embodiment

Figure 1:
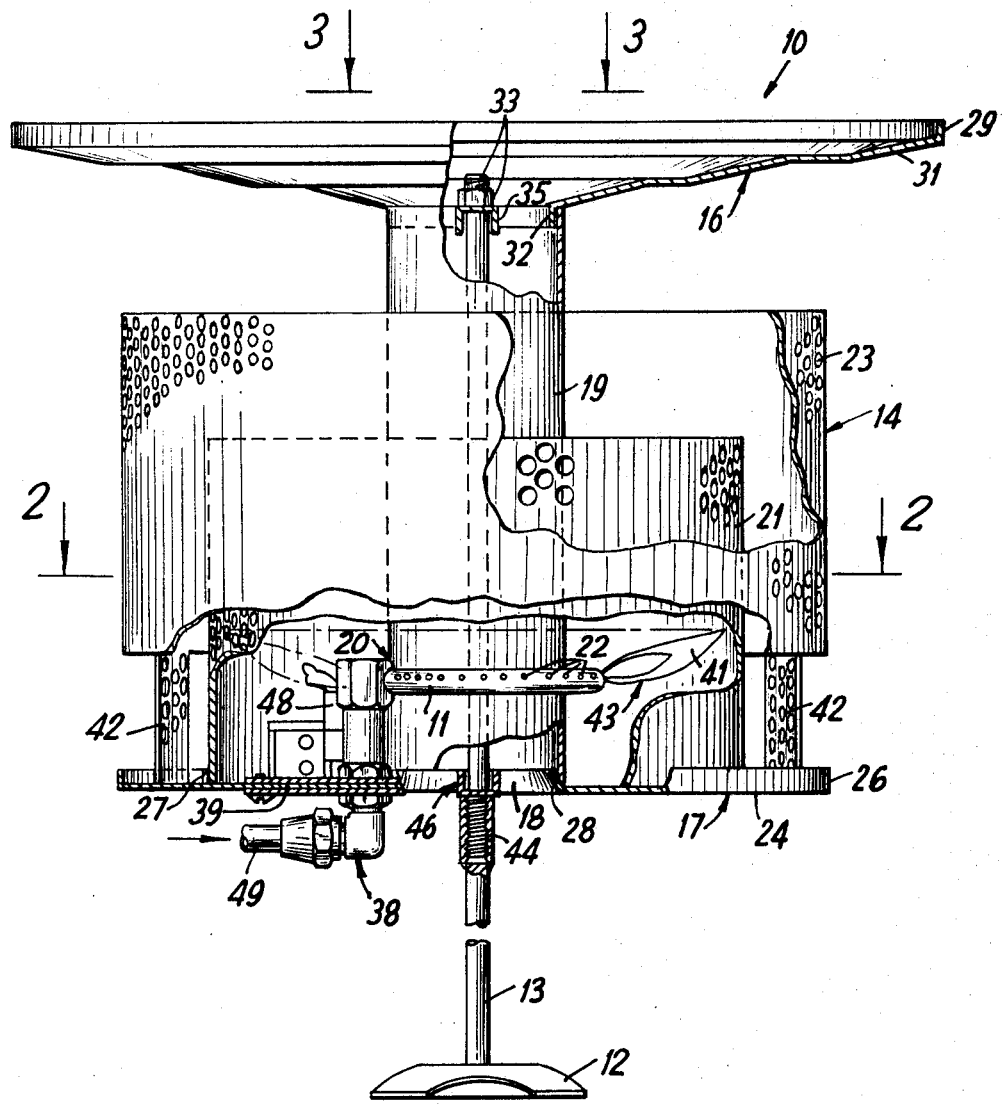
FIGURE 1 is a front view of a novel heating device in accordance with the invention with portions removed to illustrate the operation thereof.

Referring now to the accompanying drawings, there is shown a preferred embodiment of the new and improved radiant heating device of the invention, indicated generally by reference numeral 10, having a non-primary aerated burner 11. The embodiment shown in FIGURE 1 includes a base 12, a support rod 13 extending upwardly from the base 12 and a heating unit 14 adjustably mounted to the support rod 13. The support rod 13 extends along the axis of the heating unit 14 and is connected to a reflecting heat shield 16 at its other end. The heating unit 14 comprises a base plate 17 having an aperture 18 at substantially the center portion thereof and a cylindrical support and spacer tube 19 extending upwardly from the base aperture 18 to the heat shield 16 in order to provide a desirable stack effect.

The burner assembly 20 includes a circular burner 11 mounted about the tube 19 with a plurality of gas ports 22 positioned thereabout in a predetermined arrangement. Advantageously, and as here preferably embodied, the pervious radiant member of the heater 10 comprises a cylindrical screen 21, also mounted on the base plate 17 in a fixed relationship to the support tube 19 and burner 11. It will be understood that the pervious radiant may, alternatively, be formed from an equivalent structure to that of screen 21, such as, for example, a perforated sheet, a woven screen or other pervious material, the selection of which is within the skill of the art.

To achieve maximum efficiency, as more fully described hereinafter, the distance from burner 11 to screen 21 varies with the maximum gas pressure, port size, and gas rating (see FIGURE 4). The heating unit 14 is surrounded by an outer heat shield 23 which is spaced a predetermined distance from the radiant screen 21, also more fully described hereinafter.

In greater detail, the present invention pertains to a unique heating device 10, particularly suited for application as a poultry brooder heater, since the heat source is a non-primary aerated blue flame gas burner 11 capable of burning all fuel gases at varying pressures to heat a radiant to temperatures in excess of 1500° F. Furthermore, this combination of a luminous flame burner and a non-primary aerated blue flame burner can be operated automatically over a broad temperature range by means of inexpensive thermostatic controls (not shown).

Figure 2:
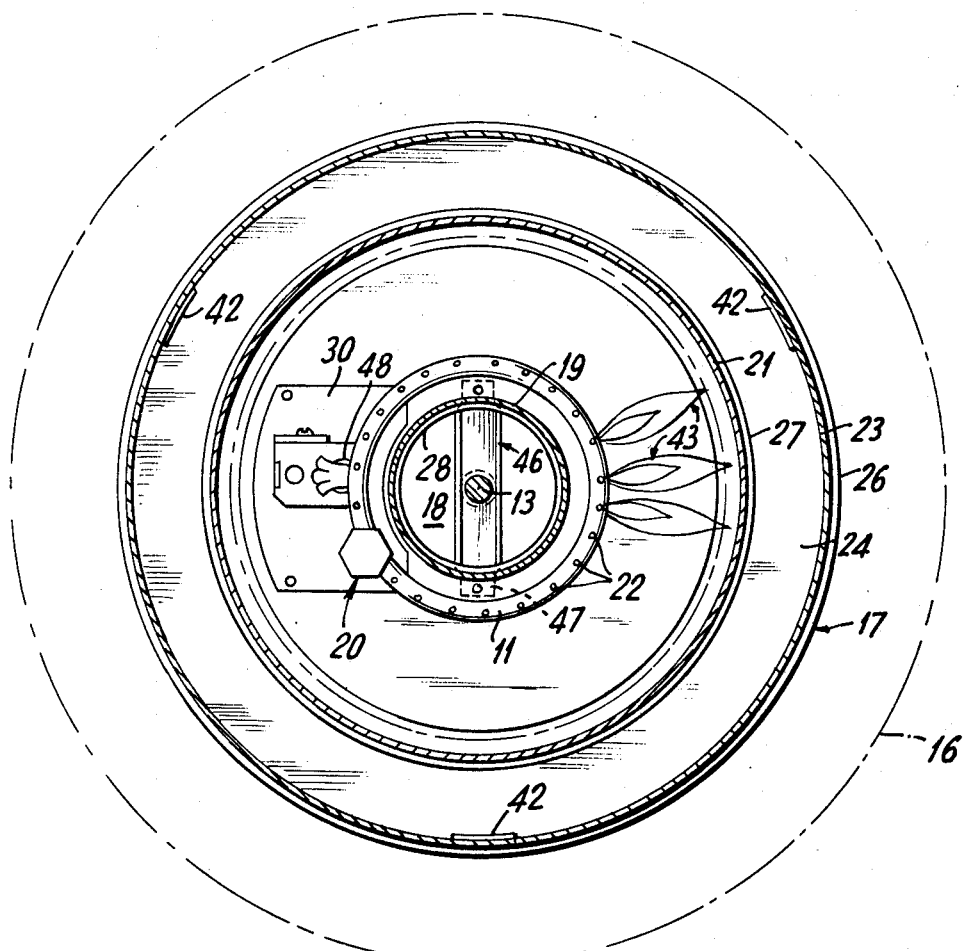
FIGURE 2 is a view of the heating device taken along the line 2—2 of FIGURE 1.

As shown in FIGURES 1 and 2, and heating unit 14 includes a base plate 17 having a platform portion 24 and flange portions 26, 27 and 28 protruding upwardly therefrom. The outer flange portion 26 about the periphery of the base plate 17 strengthens the base plate 17 and aids in positioning the perforated heat shield 23. The intermediate flange portion 27, which may, if desired, be adjusted with relation to the burner 11 by conventional connecting means, positions the radiant screen 21 on the base plate 17. The inner flange portion 28 is located about the periphery of the aperture 18, the support tube 19 being mounted thereover.

Figure 3:
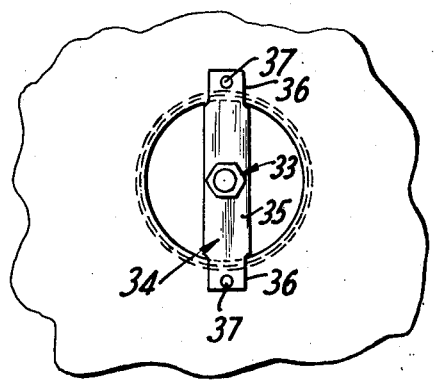
FIGURE 3 is a view taken along the line 3—3 of FIGURE 1 illustrating the assembly of the cylindrical support tube to the reflector heat shield.

The cylindrical support and spacer tube 19 is mounted over the aperture 18 in the base plate 17 and extends vertically upwardly to support a substantially frustoconical reflecting heat shield 16. The tube 19 aids in distributing heat from the burner 11 by acting as a stack, drawing in air at the bottom, heating the air during its passage through the tube 19. The heat shield 16 includes an outer flange 29, a main body portion 31 having a series of tapered portions directed downwardly and inwardly to obtain a substantially frustoconical configuration, and downwardly extending flanges 32 which fit inside the tube 19. As best seen in FIGURE 3, support rod 13 is joined to the heat shield 16 by means of a nut-and-bolt arrangement 33 which connects to the channel shaped body 35 of bracket 34. The bracket 34 extends transversely across the tube aperture 18 and is connected at its ends 36 to the shield 16 by means 37.

The burner assembly 20 includes a header inlet fitting arrangement 38 which is mounted to a reinforced area 29 of the base plate 24 and a burner tube 11 which encircles the support tube 19. The burner 11 has a plurality of gas ports 22 spaced thereabout, each upwardly inclined from the horizontal at an angle between 5°–15° and preferably upwardly inclined at an angle of 10°. The size and number of the ports 22 determines the capacity of the burner 11. Advantageously, and in the illustrated embodiment, the port sizes are approximately .016 inch in diameter for LP gas and .0225 inch in diameter for natural gas and are spaced apart about $19/64$ inches.

With thirty-four ports, each .0225 inch in diameter, natural gas will supply 45,000 B.t.u. at five inches (Water Column) pressure; the same number of ports, each .016 inch in diameter, burning LP gas at eleven inches (Water Column) pressure produce the same B.t.u. output.

Figure 4:
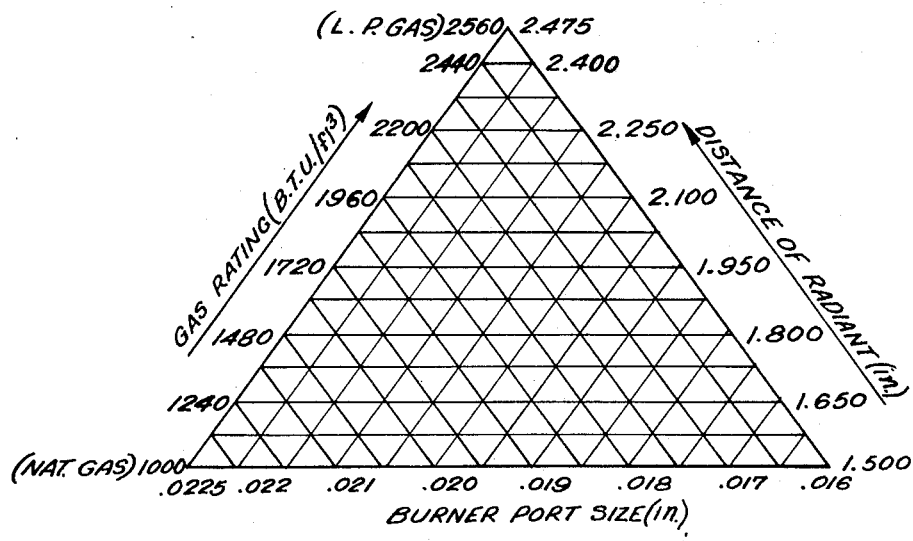
FIGURE 4 is a diagram showing the relationship between the type of gas, the port size and the distance of the radiant; and, FIGURE 5 is a graph showing the relationship between the port angle and gas pressure.

The relationship between port size, gas rating and distance of the radiant from the burner at maximum gas pressure is illustrated diagrammatically in the triangular chart of FIGURE 4. The normal use of such a chart is to determine the distance of the radiant 21 from the burner 11 for a particular B.t.u. value gas at a particular pressure and for a particular port size. Thus, it will be seen from the chart of FIGURE 4 that, at the immediately aforementioned gas pressures for natural and LP gas, respectively, and at the port sizes of 0.0225 inch and 0.016 inch, respectively, maximum efficiency is achieved in each case with the radiant spaced a distance of 2.475 inches from the burner ports. As a further example of the use of the chart, if the local gas rating is ascertained to be 1960 B.t.u./ft.$^3$, and it is desired that the port size be 0.017 inch, then maximum efficiency is achieved with the radiant spaced a distance of about 2.25 inches from the burner ports. The following Table I illustrates the foregoing and other examples of the use of the triangular chart:

TABLE I

| Gas Rating, B.t.u./Ft.$^3$ | Port Size | Distance of Radiant |
| --- | --- | --- |
| 1,960 | .017 | 2.250 |
| 2,200 | .017 | 2.400 |
| 1,240 | .017 | 1.800 |
| 1,240 | .021 | 2.400 |
| 1,240 | .019 | 2.100 |
| 1,000 | .0225 | 2.475 |
| 2,560 | .016 | 2.475 |

As previously noted, the radiant screen 21 is mounted on the base plate 17 a predetermined distance from the burner 11. This distance is obtained by placing the screen just beyond the maximum length of the yellow flame 41 so that flame impingement does not begin until the flame is blue. It will be seen that screen 21 must extend upwardly at least to a point above the first point of flame impingement for proper burner operation and preferably to the top flame impingement point at full burner input for maximum radiant effect.

As previously noted, the heating unit 14 also includes an outer perforated heat shield 23, the latter having spaced leg portions 42 which engage the base plate 12 to support and position the heat shield 23 thereon. The heat shield 23 is positioned a sufficient distance from the radiant screen 21 to prevent interference with the flame burning on the screen 21. The heat shield 23 extends to a point above the radiant screen 21 but below the reflector heat shield 16. The outer heat shield 23 is designed to permit the passage of radiant heat from the screen 21 but to prevent litter, feathers and other combustible material from coming into contact with the flame 43. Since the perforated shield 23 is open about its bottom portion, it permits the free passage of air to the combustion zone and creates a partial stack action in conjunction with the radiant screen 21. This stack action directs the air to the flame zone and causes the flame at full input to completely envelope the radiant screen 21 thus effectively enlarging the radiant area and increasing the heating efficiency of the unit 14.

The heating unit 14 is adjustably mounted on the threaded portion 44 of the support rod 13 which engages the channel member 46. The ends 47 of member 46 at either end of the aperture 18 are mounted to the base plate 17. Therefore, the unit 14 may be raised or lowered to meet specific conditions. It is also to be noted that a pilot light 48 is shown in the illustrated embodiment, although the range of operating limits is ordinarily such that no pilot 48 is required.

In operation, gas is supplied to the inlet 49 and issues from the burner ports 22 at a velocity controlled by means such as a thermostat of the modulating or snap-action type which regulates the gas pressure within the burner 11. As previously described, the rate of gas flow or gas input is related to the heat requirements and varies accordingly. At very low gas velocities at the ports 22, the gas burns with a very small blue bead but, as the velocity increases, the gas burns with a luminous flame 41. The visible flame will leave the port when the velocity of gas issuing from the ports exceeds the velocity of flame propagation. At this point, the velocity of the gas produces sufficient turbulence to mix a great enough quantity of air with the gas to produce a blue flame which is suspended in the space between the burner ring 11 and the radiant screen 21.

Figure 5:
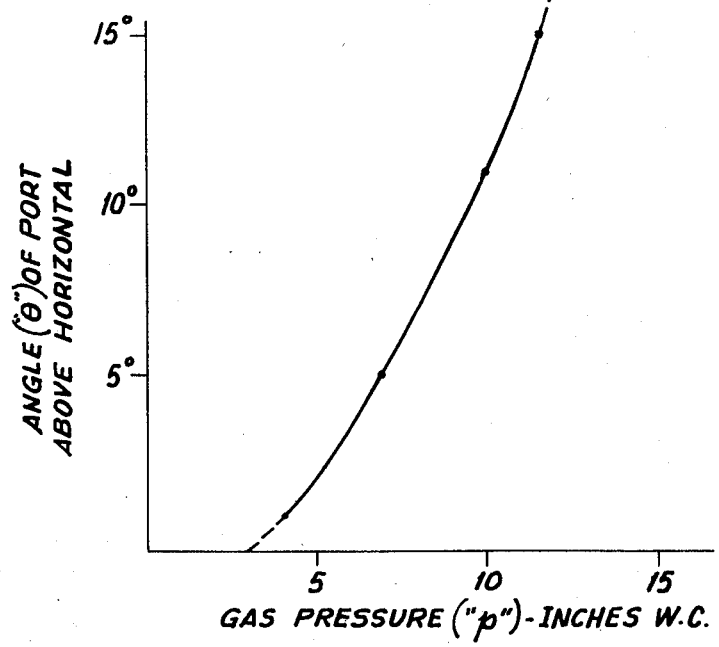

Thereafter, upon a continued increase in gas pressure, and, consequently, gas velocity, the flame reaches the screen 21 at a slight upward angle above the horizontal, ranging between 5° and 15° and preferably on the order of 10°. The relationship between the port angle and gas pressure is illustrated in the diagram of FIGURE 5. By selecting a port angle within the aforementioned range it is possible to improve the burner performance.

When the flame 43 initially contacts the screen 21, it heats a small portion thereof to radiant temperature. As more heat is required, the gas pressure within the burner 11 is increased resulting in a greater gas velocity and volume as the higher turbulence mixes more air with the gas. The velocity of the flaming gases is slowed by the pervious radiant screen 21 and the flame 43 completely envelopes the screen, heating it to a temperature in excess of 1500° F. At these temperatures, the screen glows and gives off a large amount of radiant heat. The fact that the screen 21 is perforated facilities the mixing of air and gas and the high temperature of the screen tends to help complete combustion.

With the above heating device 10, an unusually large heating effect is achieved in a small area and at a low cost. Since full flame modulation can be obtained down to inputs in the order of 400 B.t.u. per hour, the burner 11 is capable of acting as its own pilot. In addition, the heating device 10 possesses numerous other advantages—in particular, significantly superior operating performance—over present heaters due to its unique structural arrangement wherein a flame from a particular type burner impinges on a pervious radiant member, which differs considerably from conventional impingement targets. The heating device 10 is simple to maintain due to the ease of assembly and the parts are relatively inexpensive.

What has been described above are merely illustrative examples of the application of the principles of the invention. Numerous other arrangements may be readily devised by those skilled in the art which will embody the principles of the invention and fall within the spirit and scope thereof.

What is claimed is:

1. A gas-fired, radiant heating device, comprising:
 a non-primary aerated burner assembly including
  a burner element having a plurality of gas ports therein,
   each of said gas ports upwardly inclined from the horizontal at an angle of at least about 5° but less than about 15°, and
  means for supplying a combustible gas under variable pressure to said burner element so that the flame issuing from said ports may be varied between blue and yellow; and
 vertically extending pervious radiant means equally spaced from each of said burner ports at a distance immediately beyond the maximum length of yellow flame which may be issued from the burner ports, whereby flame impingement on said radiant means occurs only when the burner flame is blue and said radiant means becomes enveloped by the blue flame as the gas pressure entering the burner is increased to produce the desired radiant heat.

2. A heating device in accordance with claim 1, wherein said radiant means comprises a perforated screen.

3. A heating device in accordance with claim 1, wherein said burner ports are upwardly inclined at an angle of 10°.

4. A heating device in accordance with claim 1, wherein said combustible gas is natural gas supplied under a maximum pressure of 5 inches (Water Column), said burner ports are spaced 19/64″ apart and are each .0225" in diameter, and said radiant means is approximately 2.475" from each of said burner ports.

5. A heating device in accordance with claim 1, wherein said combustible gas is LP gas supplied under a maximum pressure of 11 inches (Water Column), said burner ports are spaced 19/64" apart and are each .016" in diameter, and said radiant means is approximately 2.475" from each of said burner ports.

6. A heating device comprising:
a base having an aperture extending therethrough;
a cylindrical support tube having one end mounted over the base aperture and extending upwardly therefrom;
a non-primary aerated burner comprising a tubular burner arranged in a circular form about the support tube and having a plurality of ports spaced thereabout, each of the burner ports being upwardly inclined from the horizontal at an angle of at least about 5° but less than about 15°; and
vertically extending pervious radiant means mounted onto said base in spaced, generally concentric relation to said burner, the distance of the space being dependent upon maximum gas pressure, burner port size and the combustible gas supplied to the burner and determined by placing said radiant means immediately beyond the maximum length of yellow flame which may be issued from the burner ports.

7. A heating device in accordance with claim 6 further including:
a reflecting heat shield having an aperture engaged by the other end of the cylindrical support tube, said tube acting as a stack to draw in cool air at its lower end and expel hot air from its upper end, and
a perforated heat shield mounted on said base in spaced, generally concentric relation to each of said pervious radiant means and said burner.

8. A heating device in accordance with claim 6 wherein:
said pervious radiant means is spaced from said burner at a distance immediately beyond the maximum length of yellow flame which may be issued from the burner ports, whereby flame impingement on said radiant means occurs only when the burner flame is blue and said radiant means becomes enveloped by the blue flame as the gas pressure entering the burner is increased to produce the desired radiant heat.

9. A heating device in accordance with claim 7 wherein:
said reflecting heat shield comprises a substantially frustoconical body portion tapering downwardly to said aperture, said aperture being centrally located at its lower end, and
said perforated heat shield comprises a cylindrical body portion having at least one downwardly extending leg which is mounted on said base, said heat shield being spaced from said pervious radiant means a distance sufficient to prevent interference with the operation of said radiant.

10. A heating device in accordance with claim 7 wherein:
said base includes an outer flange portion about the outer periphery thereof to facilitate mounting of said heat shield, an intermediate flange portion to facilitate mounting of said pervious radiant means, an inner flange portion about the periphery of said aperture to facilitate mounting of said cylindrical support tube.

11. A heating device in accordance with claim 7 further including:
a support rod adjustably coupled to said base at an intermediate portion thereof and coupled to said reflecting heat shield at one end thereof, and
a further base arrangement mounted to the other end of the support rod.

12. A heating device in accordance with claim 8, wherein said radiant means comprises a perforated screen of a generally cylindrical configuration.

13. A heating device in accordance with claim 6 wherein in each of said burner ports is upwardly inclined from the horizontal at an angle of 10°.

14. A heating device in accordance with claim 9 wherein:
the body portion of the perforated heat shield extends from approximately the burner level to above the upper end of the pervious radiant to provide a stack effect which channels air past said leg to said pervious radiant means, between said pervious radiant means and heat shield and out through the space between said reflecting heat shield and said perforated heat shield.

15. A heating device in accordance with claim 11 further including:
a first transverse member extending across the upper end of said support tube and mounted at its ends to said reflecting heat shield, said first member being connected to one end of said support rod, and,
a second transverse member extending across the lower end of said support tube and mounted at its ends to said base plate, said second member including a threaded portion engaged by an intermediate portion of the support rod.

16. A heating device comprising:
a base plate having an aperture extending axially therethrough and locating means positioned thereon;
support means having one end mounted over the aperture in said base plate and positioned by said locating means;
a burner mounted adjacent said support means having a plurality of ports spaced in predetermined position therein, each of the burner ports being upwardly inclined from the horizontal at an angle of at least 5° but less than about 15°;
vertically extending radiant means spaced a predetermined distance from said burner and positioned on said base plate by said locating means;
a heat reflector having an aperture extending therethrough and engaging the other end of said support means, said reflector being spaced above said radiant means and opposite said base plate; and
a heat shield spaced a predetermined distance from said radiant means and positioned on said base plate by said locating means.

17. A heating device in accordance with claim 16 wherein:
said support means comprises a tube;
said burner comprises a non-primary aerated blue flame burner having a tubular configuration and arranged about the support tube; and
said radiant means is spaced from said burner at a distance immediately beyond the maximum length of yellow flame which may be issued from said burner ports.

18. A heating device in accordance with claim 17 wherein:
said radiant means comprises a perforated screen having a generally cylindrical configuration, and
said heat shield comprises a perforated generally cylindrical screen having a plurality of downwardly extending legs mounted to said base plate, the heat shield screen being spaced above said base plate and terminating short of said heat reflector.

19. A heating device in accordance with claim 18 wherein:
said heat reflector comprises a main body portion having at least one downwardly tapering surface forming a substantially inverted frustoconical surface terminating in a central aperture, and
said heating device further includes a support rod connected to said heat reflector at one end and connected to said base plate at an intermediate position and a further base at the other end.

References Cited

UNITED STATES PATENTS

| | | | |
|---|---|---|---|
| 1,237,858 | 8/1917 | Ballenger | 126—85 |
| 1,591,813 | 7/1926 | Frengle. | |
| 2,985,137 | 5/1961 | Horne. | |
| 3,027,888 | 4/1962 | Du Fault et al. | |
| 3,349,752 | 10/1967 | Murphy. | |

CHARLES J. MYHRE, Primary Examiner

U.S. Cl. X.R.

126—92; 431—328